US011185776B2

(12) United States Patent
Raichel et al.

(10) Patent No.: US 11,185,776 B2
(45) Date of Patent: Nov. 30, 2021

(54) SYSTEMS AND METHODS FOR PROVIDING A DYNAMIC OBSTACLE IN A COMPUTER GAME

(71) Applicant: Playtika Ltd., Hertsliya (IL)

(72) Inventors: Jenny Raichel, Rishon Letzion (IL);
Or Ben Shabat, Afula (IL)

(73) Assignee: Playtika Ltd., Hertsliya (IL)

( * ) Notice: Subject to any disclaimer, the term of this patent is extended or adjusted under 35 U.S.C. 154(b) by 0 days.

(21) Appl. No.: 16/740,520

(22) Filed: Jan. 13, 2020

(65) Prior Publication Data

US 2021/0213358 A1 Jul. 15, 2021

(51) Int. Cl.
*A63F 13/69* (2014.01)
*G07F 17/32* (2006.01)
*A63F 13/537* (2014.01)

(52) U.S. Cl.
CPC ............ *A63F 13/537* (2014.09); *A63F 13/69* (2014.09); *G07F 17/3293* (2013.01)

(58) Field of Classification Search
None
See application file for complete search history.

(56) References Cited

U.S. PATENT DOCUMENTS

| 6,077,161 A | 6/2000 | Wisler |
| 6,089,977 A * | 7/2000 | Bennett ................... G07F 17/34 463/20 |
| 6,332,615 B1 | 12/2001 | Watanabe |
| 7,204,413 B2 | 4/2007 | Huang et al. |
| 7,922,571 B2 | 4/2011 | Walker et al. |
| 2003/0042676 A1 * | 3/2003 | Crawford ............ A63F 3/00157 273/292 |
| 2003/0057645 A1 * | 3/2003 | Baerlocher ......... G07F 17/3244 273/138.2 |
| 2006/0232011 A1 | 10/2006 | Hummel et al. |
| 2011/0012307 A1 | 1/2011 | Chou |

* cited by examiner

*Primary Examiner* — Damon J Pierce
(74) *Attorney, Agent, or Firm* — Pearl Cohen Zedek Latzer Baratz LLP

(57) ABSTRACT

A system and method for providing a dynamic obstacle in a computer game may include: altering a display of each of a subset of game assets displayed by a computer system with a visual indication that indicates that the subset of game assets are available for inhibition; displaying associated with a game asset an inhibitor, wherein displaying an inhibitor associated with the game asset indicates that the game asset is inhibited; and periodically removing from display the inhibitor from one game asset of the subset of game assets and displaying the inhibitor associated with another game asset of the subset of game assets.

18 Claims, 5 Drawing Sheets

SYSTEMS AND METHODS FOR PROVIDING A DYNAMIC OBSTACLE IN A COMPUTER GAME

FIELD OF THE INVENTION

The present invention relates generally to providing a dynamic obstacle or inhibitor and a display of the dynamic obstacle or inhibitor in a computer game produced and displayed by a computer system, and specifically to providing a dynamic obstacle in a computer card game.

BACKGROUND

Playing a computer game may be fun and enjoyable. However, after playing the same game for some time, a player may get bored and move to a different game. Adding new game features may increase the interest of the player in the game. Specifically, adding challenging features may increase the interest of the player in the game and thus increase player retention.

Therefore, new challenging features for a computer games are required.

SUMMARY

According to embodiments of the invention, a system and method for providing a dynamic obstacle in a computer game may include: altering a display of each of a subset of game assets displayed by a computer system with a visual indication that indicates that the subset of game assets are available for inhibition; displaying associated with a game asset an inhibitor, wherein displaying an inhibitor associated with the game asset indicates that the game asset is inhibited; and periodically removing from display the inhibitor from one game asset of the subset of game assets and displaying the inhibitor associated with another game asset of the subset of game assets.

According to embodiments of the invention, the computer game may be a card game and the game assets may be cards.

According to embodiments of the invention, displaying associated with a card the inhibitor may prevent the user from playing with the card.

Embodiments of the invention may include removing from display the inhibitor from one game asset of the subset of game assets and displaying the inhibitor associated with another game asset of the subset of game assets until all the game assets of the subset of game assets, except for the game asset that is currently inhibited, have been played with.

Embodiments of the invention may include removing the inhibitor from the computer game after all the game assets of the subset of game assets, except for the game asset that is currently inhibited, have been played with.

According to embodiments of the invention, the inhibitor may be removed from display from one game asset of the subset of game assets and displayed associated with another game asset of the subset of game assets randomly among the game assets of the subset of game assets.

According to embodiments of the invention, the inhibitor may be removed from display from one game asset of the subset of game assets and displayed associated with another game asset of the subset of game assets according to a predetermined pattern among the game assets of the subset of game assets.

According to embodiments of the invention, the inhibitor may be removed from display from one game asset of the subset of game assets and displayed associated with another game asset of the subset of game assets according to a weighted random pattern.

According to embodiments of the invention, the inhibitor may be removed from display from one game asset of the subset of game assets and displayed associated with another game asset of the subset of game assets only after a player gained a predetermined number of points in the game.

Embodiment of the invention may include providing an undo function, wherein when used, the undo function removes the inhibitor from display from the one game asset of the subset of game assets and displays the inhibitor associated with a game asset previously inhibited by the inhibitor.

According to embodiments of the invention, a system and method for providing a dynamic obstacle in a computer game may include: marking each of a subset of game assets with a visual indication that indicates that the marked game assets are susceptible for inhibition; providing an inhibitor, wherein placing the inhibitor on a game asset indicates that the game asset is inhibited; and occasionally moving the inhibitor from one game asset of the subset of game assets to another game asset of the subset of game assets.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
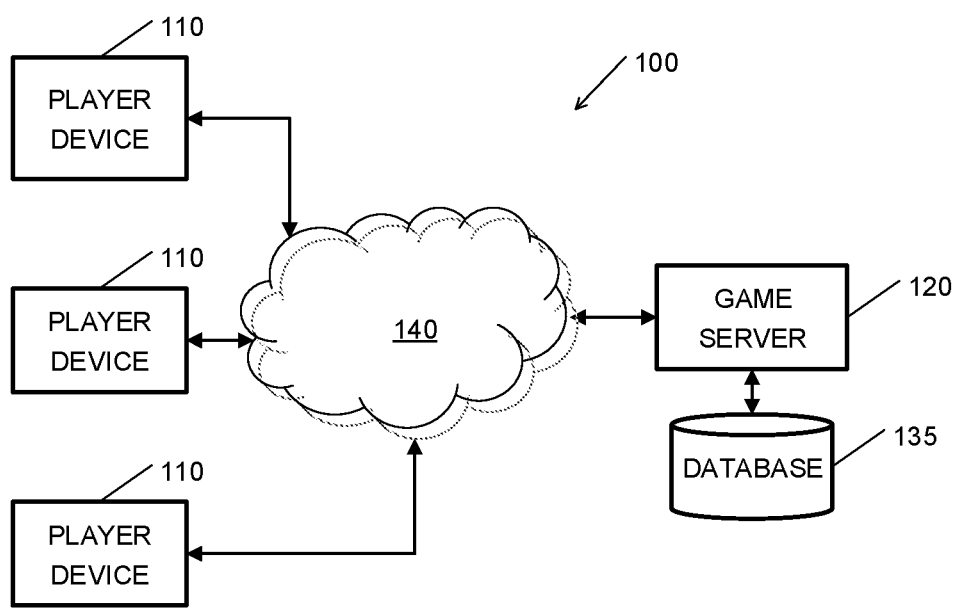
FIG. 1 is system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Embodiments of the invention may provide a dynamic obstacle or an inhibitor and a display of same to a computer game. The dynamic obstacle or inhibitor may add a challenging feature to a computer game and may increase the interest of the player in the game and thus increase player retention. Embodiments of the invention may improve the technology of computer games by providing a dynamic obstacle or inhibitor that may add a challenging feature to a computer game. Adding challenging features to a computer game may increase the interest of the player in the computer game and thus increase player retention.

Reference is made to FIG. 1, which schematically illustrates a system 100, according to embodiments of the invention. System 100 may include one or more player devices or user devices 110 connectable to a network 140, e.g., the internet, and one or more game servers 120, each connectable to network 140.

Figure 6:
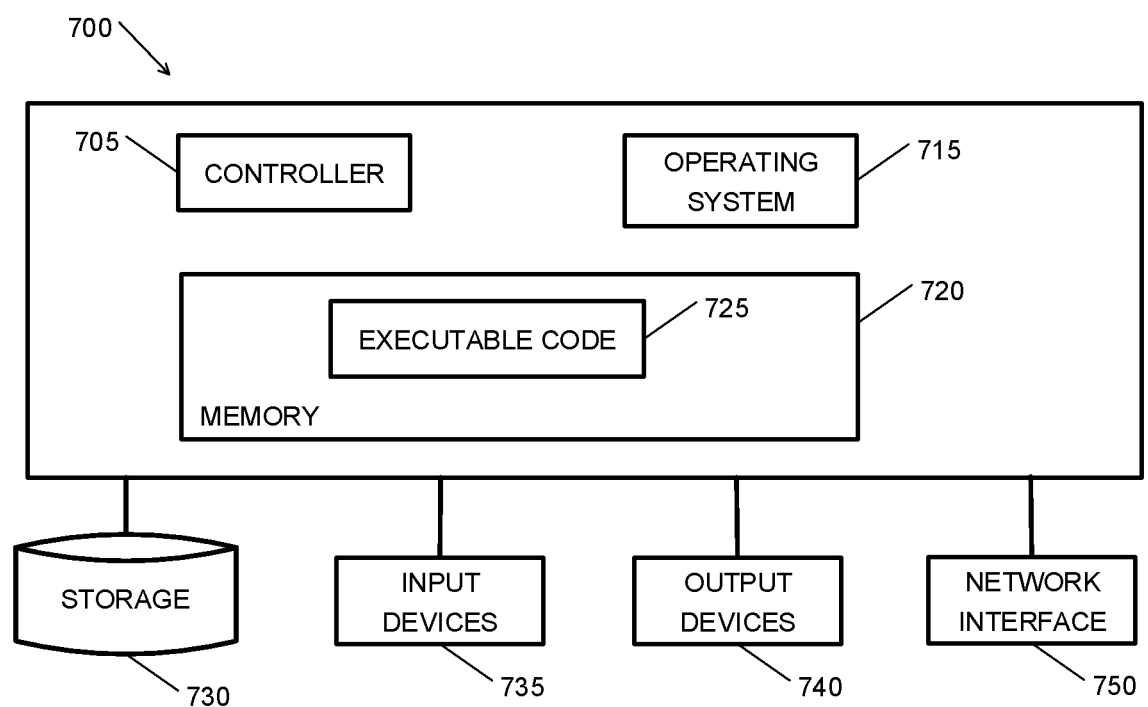
FIG. 6 illustrates an example computing device according to an embodiment of the invention.

Each of player devices 110 and game servers 120 may be or may include a computing device such as computing device 700 depicted in FIG. 6. One or more database 135 may be or may include a storage device such as storage device 730. Database 135 may store parameters related to a computer game, including game assets and inhibitors, according to embodiments of the invention.

According to some embodiments, a game server 120 may host a computer game as disclosed herein. The computer game may be offered to any of player devices 110 over network 140. Other system architectures may be used, for example according to some embodiments, the computer game may be self-contained in player device 110.

Networks 140 may include any type of network or combination of networks available for supporting communication between player devices 110 and game servers 120. Networks 140 may include for example, wired and wireless telephone networks, the Internet and intranet networks, etc.

Figure 2:
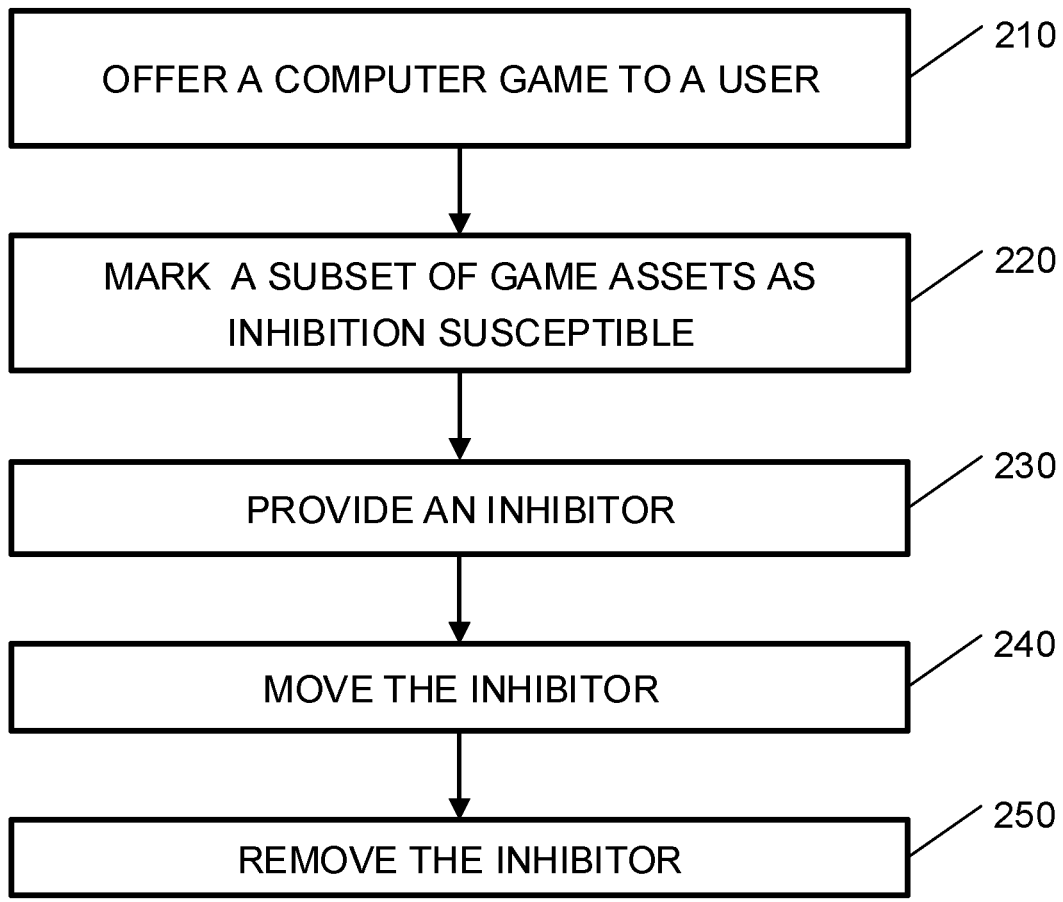
FIG. 2 is a flowchart of a method for providing a dynamic obstacle in a computer game, according to embodiments of the invention.

Reference is made to FIG. 2, which is a flowchart of a method for providing a dynamic obstacle in a computer game, according to embodiments of the invention. An embodiment of a method providing a dynamic obstacle in a computer game may be performed, for example, by the systems shown in FIGS. 1 and 6, but other hardware may be used.

In operation 210, a computer game may be offered or provided, or displayed, to a user; e.g. a game server (e.g. game server 210) may execute code to generate a game which may be displayed on a player device (e.g. device 110), and a user may provide input to the player device which may cause the player device or the game server to play the game and alter display of the game. The computer game may include game assets usable by the player to achieve game goals according to game rules. For example, the computer game may be a card game and the game assets may include cards (e.g. conventional playing cards from a 52 card playing card deck, or other types of cards). For example, in a card computer game a plurality of cards may be placed in piles and the user may play with one card at a time according to game rules. Specifically, in a Solitaire commuter card game, cards may be placed in piles where the top card in each pile may face up (e.g., the value of the card is visible and the card is usable by the player) while other cards in the pile may face down (e.g., the value of the card is not visible and the card is not usable by the player). A user may be requested to sort the cards using any of the up-facing cards, according to specific rules. When a user uses or plays with a card in a pile, a next card in the pile faces up. Other computer card games or other computer games may be provided to the user.

Figure 3:
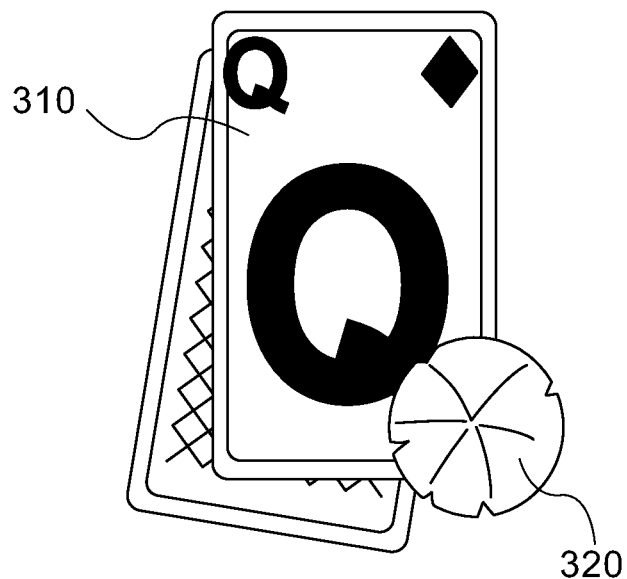
FIG. 3 is an example of a visual indication that indicates that the marked game assets are susceptible for inhibition, according to embodiments of the invention.

In operation 220, each of a subset of game assets may be marked, e.g., with a visual indication. For example, the display of marking each of a subset of game assets displayed by a computer system may be altered with a visual indication. The visual indication or marking may indicate that the marked game assets are susceptible to or available for inhibition or blocking. Inhibition may refer to preventing a player from using, or preventing a player from playing with the marked game asset in the game, as long as the game asset is inhibited. Being susceptible or available for inhibition may imply that the marked game assets may sometime in the progression of the game be inhibited. Assets not susceptible or available for inhibition cannot be inhibited or blocked, per the game operation or rules. In a certain computer game, some of the game assets may be susceptible for inhibition and some may not. For example, in a Solitaire computer card game, some cards facing up may be susceptible for inhibition and may be marked, e.g., with a visual indication. FIG. 3 is an example of a marking that indicates that the marked game assets are susceptible for inhibition, according to embodiments of the invention. The game asset in FIG. 3 is a card 310 and the visual indication of the exemplary inhibitor is a lily 320. A marking may be any visual inhibition displayed associated with, covering, partially covering, or over the asset.

Figure 4:
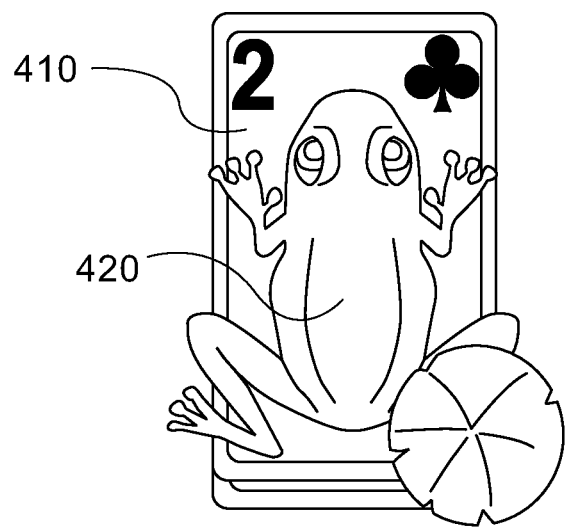
FIG. 4 is an example of an inhibitor, according to embodiments of the invention.

In operation 230, an inhibitor, also referred to as a dynamic obstacle, may be provided and displayed. According to some embodiments, the inhibitor may be associated with, mark or visually placed on, over, or partially over one or some of the game assets that are susceptible or available for inhibition. Associating an inhibitor with a game asset may, per the rules or execution of the game (as executed by, e.g. a game server) inhibit or block the game asset (e.g., a card in a card game), and the player may not be able to play with that game asset as long as the inhibitor is associated with the game asset. For example, in some embodiments, visually placing the inhibitor on a game asset may indicate that the game asset is inhibited or blocked, and the player may not be able to play with that game asset as long as the inhibitor is placed on the game asset. Thus, the player may be able to play with, or use in the computer game, the game assets that are not inhibited, and may not be allowed to use the game assets that are inhibited. FIG. 4 is an example of an inhibitor, according to embodiments of the invention. The game asset in FIG. 4 is a card 410 and the visual indication of the exemplary inhibitor is a frog 420. Other assets and other inhibitors may be used.

In operation 240, the inhibitor may be moved from one game asset to another game asset that is susceptible or available for inhibition, e.g., by the system. For example, an inhibitor may be removed from display from a first game asset, and may start to be displayed associated with another game asset. As noted, when an inhibitor is associated with a game asset, the player is prevented from using this game asset, and may play with other game assets that are available for him, including those that are marked as susceptible or available for inhibition. Thus, when the inhibitor is moved from one game asset to another game asset, the game asset that was previously inhibited by the inhibitor is no longer inhibited and the player may play with this game asset. According to some embodiments, the inhibitor may be moved from one game asset to another game asset (e.g., removed from display from one game asset and displayed associated with another game asset) until all the game assets that are marked as susceptible or available for inhibition, except for the game asset that is currently inhibited, have been played with.

According to some embodiments, the inhibitor may be moved periodically or occasionally, e.g., from time to time or sporadically, once per a period of time, every duration of time X, etc. among the game assets that are susceptible for inhibition. Moving the inhibitor may include stopping displaying the inhibitor on or associated with a first asset and starting displaying the inhibitor on or associated with a second asset. According to some embodiments, the inhibitor may be moved randomly among the game assets that are susceptible for inhibition. According to some embodiments, the inhibitor may be moved according to a predetermined pattern among the game assets that are susceptible for inhibition. According to some embodiments, the inhibitor may be moved among the game assets that are susceptible for inhibition according to a weighted random pattern. According to some embodiments, the inhibitor may be moved from one game asset that is susceptible for inhibition to another game asset that is susceptible for inhibition only after a player gained a predetermined number of points, or performed a predetermined game-related task in the computer game, as designed by the game developer.

According to some embodiments, an undo function may be provided in the computer game. For example, when used or selected by the player in the computer game, the undo function may move the inhibitor to the game asset that was previously inhibited by the inhibitor. When continuing to play after using an undo function, the inhibitor may jump or be moved to a different game asset that is susceptible for inhibition (unless the inhibitor is moved according to a predetermined pattern).

In operation 250, the inhibitor may be removed from the computer game or from a level in the computer game, after all the game assets that were susceptible for inhibition, except for the game asset that is currently inhibited, have been played with.

In some embodiments more than one inhibitor may be provided. In some embodiments a plurality of inhibitors may be associated with a single type of marking. Thus, all the game assets that are susceptible for inhibition may be associated with the same marking or visual sign, and the plurality of inhibitors may be moved among all the game assets that are susceptible for inhibition. According to some embodiments, each inhibitor may be associated with a dedicated marking, and each inhibitor may be moved among the game assets that are marked with the marking that is associated with that inhibitor.

Figure 5:
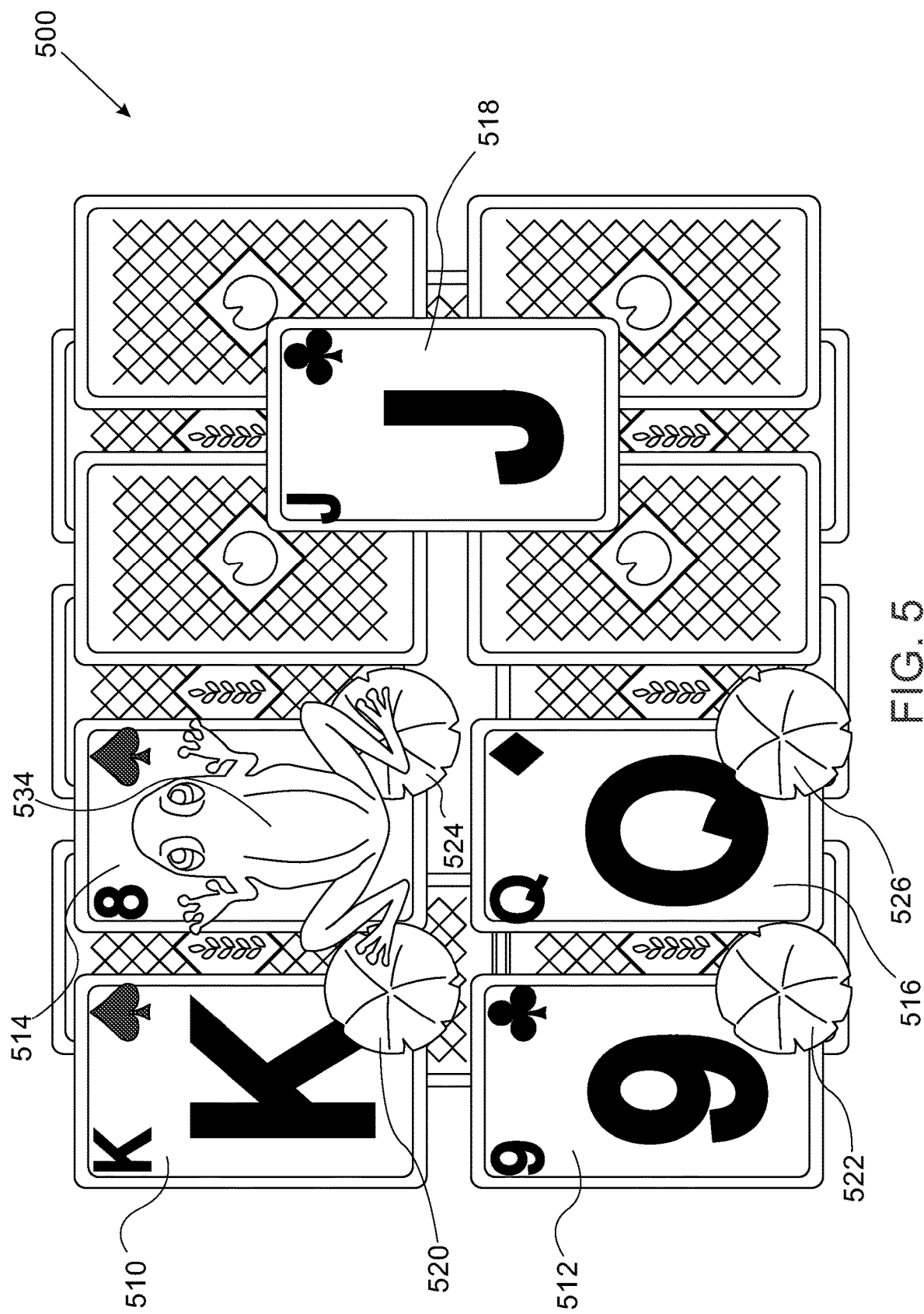
FIG. 5 is an example of a game screenshot, according to embodiments of the invention.

FIG. 5 is a partial screenshot 500 of a card game, according to embodiments of the invention. The game assets displayed in the game in FIG. 5 are cards 510, 512, 514, 516 and 518, the visual indication of the exemplary inhibitor is a lily 520, 522, 524 and 526 and the visual indication of the exemplary inhibitor is a frog 534. Thus, in the example provided in FIG. 5, cards 510, 512, 514, 516, are each marked by a lily 520, 522, 524 and 526, respectively, and are therefore susceptible for inhibition. Card 514 is inhibited or blocked by frog 534. Card 518 is not marked by a lily and is not susceptible to or available for inhibition. At this point in the computer card game, the user may play with cards 510, 512, 516 and 518, and may not play with card 514 that is blocked or inhibited by frog 534. At any point in time, or after the player achieves a game goal, frog 534 may jump or move to one of cards 510, 512, 516, which are marked by a lily 520, 522 and 526. If, after frog 534 jumps to another card 510, 512, 516 the player uses an undo function, frog 534 may jump back to card 514.

FIG. 6 illustrates an example computing device according to an embodiment of the invention. Various components such as user devices 110, game servers 120, and other modules, may be or include computing device 700, or may include components such as shown in FIG. 6. For example, a first computing device 700 with a first processor 705 may be used to provide a dynamic obstacle in a computer game.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer, or may be at least partially implemented by one or more remote servers (e.g., in the "cloud").

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include an application to provide a dynamic obstacle or inhibitor and a display of same in a computer game. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 6 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a WiFi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for providing a dynamic obstacle in a computer game, the method comprising:

altering a display of each of a subset of game assets displayed by a computer system with a visual indication that indicates that the subset of game assets are available for inhibition;

displaying associated with a game asset an inhibitor, wherein displaying the inhibitor associated with the game asset indicates that the game asset is inhibited; and periodically removing from display the inhibitor from one game asset of the subset of game assets and displaying the inhibitor associated with another game asset of the subset of game assets, wherein the inhibitor is removed from display from one game asset of the subset of game assets and displayed associated with another game asset of the subset of game assets only after a player gained a predetermined number of points in the game.

2. The method of claim 1, wherein the computer game is a card game and the game assets are cards.

3. The method of claim 2, wherein displaying associated with a card the inhibitor prevents the user from playing with the card.

4. The method of claim 1, comprising removing from display the inhibitor from one game asset of the subset of game assets and displaying the inhibitor associated with another game asset of the subset of game assets until all the game assets of the subset of game assets, except for the game asset that is currently inhibited, have been played with.

5. The method of claim 1, comprising removing the inhibitor from the computer game after all the game assets of the subset of game assets, except for the game asset that is currently inhibited, have been played with.

6. The method of claim 1, wherein the inhibitor is removed from display from one game asset of the subset of game assets and displayed associated with another game asset of the subset of game assets randomly among the game assets of the subset of game assets.

7. The method of claim 1, wherein the inhibitor is removed from display from one game asset of the subset of game assets and displayed associated with another game asset of the subset of game assets according to a predetermined pattern among the game assets of the subset of game assets.

8. The method of claim 1, wherein the inhibitor is be removed from display from one game asset of the subset of game assets and displayed associated with another game asset of the subset of game assets according to a weighted random pattern.

9. The method of claim 1, comprising:
providing an undo function, wherein when used, the undo function removes the inhibitor from display from the one game asset of the subset of game assets and displays the inhibitor associated with a game asset previously inhibited by the inhibitor.

10. A system for providing a dynamic obstacle in a computer game, the system comprising:
a memory;
a processor configured to:
alter a display of each of a subset of game assets displayed by a computer system with a visual indication that indicates that the subset of game assets are available for inhibition;
display associated with a game asset an inhibitor, wherein displaying the inhibitor associated with the game asset indicates that the game asset is inhibited; and
periodically remove from display the inhibitor from one game asset of the subset of game assets and display the inhibitor associated with another game asset of the subset of game assets,
wherein the processor is configured to remove the inhibitor from display from one game asset of the subset of game assets and display associated with another game asset of the subset of game assets only after a player gained a predetermined number of points in the game.

11. The system of claim 10, wherein the computer game is a card game and the game assets are cards, wherein displaying associated with a card the inhibitor prevents the user from playing with the card.

12. The system of claim 10, wherein the processor is configured to remove from display the inhibitor from one game asset of the subset of game assets and display the inhibitor associated with another game asset of the subset of game assets until all the game assets of the subset of game assets have been played with.

13. The system of claim 10, wherein the processor is configured to remove the inhibitor after all the game assets of the subset of game assets, except for the game asset that is currently inhibited, have been played with.

14. The system of claim 10, wherein the processor is configured to remove the inhibitor from display from one game asset of the subset of game assets and display associated with another game asset of the subset of game assets randomly among the game assets of the subset of game assets.

15. The system of claim 10, wherein the processor is configured to remove the inhibitor from display from one game asset of the subset of game assets and display associated with another game asset of the subset of game assets according to a predetermined pattern among the game assets of the subset of game assets.

16. The system of claim 10, wherein the processor is configured to move the inhibitor among the game assets of the subset of game assets according to a weighted random pattern.

17. The system of claim 10, wherein the processor is configured to:
provide an undo function, wherein when used, the undo function removes the inhibitor from display from the one game asset of the subset of game assets and displays the inhibitor associated with a game asset previously inhibited by the inhibitor.

18. A method for providing a dynamic obstacle in a computer game, the method comprising:
marking each of a subset of game assets with a visual indication that indicates that the marked game assets are susceptible for inhibition;
providing an inhibitor, wherein placing the inhibitor on a game asset indicates that the game asset is inhibited; and
moving the inhibitor from one game asset of the subset of game assets to another game asset of the subset of game assets, only after a player gained a predetermined number of points in the game.

* * * * *